(12) United States Patent
Leymann et al.

(10) Patent No.: US 6,976,257 B2
(45) Date of Patent: Dec. 13, 2005

(54) CONTEXT BASED EXECUTION PRIORITIZATION IN WORKFLOW-MANAGEMENT-SYSTEMS

(75) Inventors: Frank Leymann, Aidlingen (DE); Dieter Roller, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 1071 days.

(21) Appl. No.: 09/752,960

(22) Filed: Jan. 2, 2001

(65) Prior Publication Data

US 2001/0021913 A1    Sep. 13, 2001

(30) Foreign Application Priority Data

Dec. 30, 1999    (EP) .................................. 99126200

(51) Int. Cl.[7] ............................................... G06F 9/46
(52) U.S. Cl. ..................................................... 718/103
(58) Field of Search ........................ 705/8, 38; 718/103

(56) References Cited

U.S. PATENT DOCUMENTS 5,826,239 A * 10/1998 Du et al. ......................... 705/8
6,130,757 A * 10/2000 Yoshida et al. ............ 358/1.15

* cited by examiner

*Primary Examiner*—Meng-Al T. An
*Assistant Examiner*—Camquy Truong
(74) *Attorney, Agent, or Firm*—Whitham, Curtis & Christofferson, P.C.; Stephen C. Kaufman

(57) ABSTRACT

The invention relates to a computerized method of managing workload within a Workflow-Management-System (WFMS) said WFMS comprising a process model, said process model comprising one or more activities being the nodes of an arbitrary graph, and directed edges of said graph defining a potential control flow within said process-model.

The inventions suggests a determination step, wherein the process model is analyzed if a priority execution specification is assigned to said one activity comprising at least one Boolean predicate and a priority level.

In a launching step said Boolean predicate is evaluated using a variable value not comprised in the process model but the variable value being comprised in a context of an instance of the process-model. If the Boolean predicate evaluates to TRUE, the launching step launches execution of said one activity in said activity's execution environment with an execution priority specified according to the priority level.

6 Claims, 3 Drawing Sheets

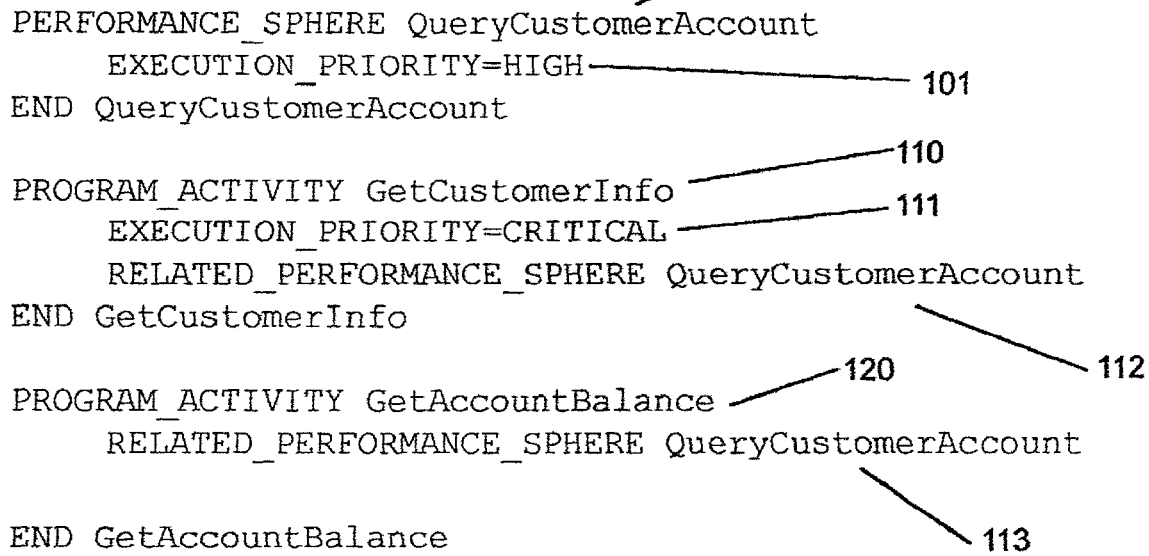

```
PERFORMANCE_SPHERE QueryCustomerAccount
     EXECUTION_PRIORITY=HIGH ———————————— 101
END QueryCustomerAccount
                                          ————110
PROGRAM_ACTIVITY GetCustomerInfo ————
     EXECUTION_PRIORITY=CRITICAL ————————111
     RELATED_PERFORMANCE_SPHERE QueryCustomerAccount
END GetCustomerInfo
                                                    ——112
PROGRAM_ACTIVITY GetAccountBalance ———120
     RELATED_PERFORMANCE_SPHERE QueryCustomerAccount END GetAccountBalance                         ——113
```

```
STRUCTURE LoanProcessData
    LoanAmount Long
END LoanProcessData                    ─ 201

PROCESS LoanProcess (LoanProcessData,)     ─ 210
    EXECUTION_PRIORITY=
211 ─────────(HIGH,   (Input.LoanAmount > 10000))
           (MEDIUM, (Input.LoanAmount > 5000)),
221 ─          LOW END LoanProcess                             ─ 220
```

FIG. 2

```
                    302
                     |
    STRUCTURE  LoanProcessData
        LoanAmount  LONG
    END LoanProcessData
                              303
    PROCESS LoanProcess                    304
        EXECUTION_PRIORITY=
            (HIGH,
                (CollectData.Output.LoanAmount > 10000)),
            (MEDIUM,
                (CollectData.Output.LoanAmount > 5000)),
            LOW
                                  306
        PROGRAM_ACTIVITY CollectData  (,LoanProcessData)
        END CollectData
                                        305
    END LoanProcess
                         301
```

FIG. 3

CONTEXT BASED EXECUTION PRIORITIZATION IN WORKFLOW-MANAGEMENT-SYSTEMS

BACKGROUND OF THE INVENTION

1. Field of the Invention

The present invention relates to the area of performance and workload management within a Workflow-Management-System (WFMS).

2. Description and Disadvantages of Prior Art

A new area of technology with increasing importance is the domain of Workflow-Management-Systems (WFMS). WFMS support the modeling and execution of business processes. Business processes executed within a WFMS environment control which piece of work of a network of pieces of work will be performed by whom and which resources are exploited for this work. The individual pieces of work might be distributed across a multitude of different computer systems connected by some type of network. A thorough representation of WFMS technology is given by Frank Leymann, Dieter Roller, Production Workflow: Concepts and Techniques, Prentice-Hall, Upper Saddle River, N.J., 1999.

The product "IBM MQSeries Workflow" represents such a typical modern, sophisticated, and powerful workflow management system. It supports the modeling of business processes as a network of activities. This network of activities, the process model, is constructed as a directed, acyclic, weighted, colored graph. The nodes of the graph represent the activities which are performed. The edges of the graph, the control connectors, describe the potential sequence of execution of the activities. Definition of the process graph is via the IBM MQSeries Flow Definition Language (FDL) or the built-in graphical editor. The runtime component of the workflow manager interprets the process graph and distributes the execution of activities to the right person at the right place, e.g. by assigning tasks to a work list according to the respective person, wherein said work list is stored as digital data within said workflow or process management computer system.

Business processes quite often consist of parts that are time critical, others are not. In particular time critical maybe those parts of a process that are carried out automatically; that means without any user intervention.

One method that has been proposed to control the processing behavior of a set of activities in terms of workload balancing is via the support of a workload management system (WLMS). Even if the WFMS may exploit the support of a WLMS to achieve its processing targets this is limited to certain processing environments only as only highly sophisticated operating systems like IBM's MVS system do provide this type of technology. Especially within a heterogeneous distributed processing environment, in which WFMS do operate, WLM-technology is missing on most of the involved systems. A more advanced approach that has been proposed allows to specify execution priorities for individual activities, for a set of activities, or for the complete process model of a business process. But this approach has the significant disadvantage that each instantiation of such a process model is executed by the WFMS with identical execution priority characteristics. This teaching does not allow to differentiate between process instances whose processing is more important than another one.

OBJECTIVE OF THE INVENTION

The invention is based on the objective to provide a more flexible approach for performance improved processing of time critical parts of a process model also operating within a heterogeneous and distributed environment.

The invention relates to a computerized method of managing workload within a Workflow-Management-System (WFMS) said WFMS comprising a process model, said process model comprising one or more activities being the nodes of an arbitrary graph, and directed edges of said graph defining a potential control flow within said process-model.

The invention includes a determination step, wherein the process model is analyzed if a priority execution specification is assigned to said one activity comprising at least one Boolean predicate and a priority level.

In a launching step said Boolean predicate is evaluated using a variable value not comprised in the process model but the variable value being comprised in a context of an instance of the process-model. If the Boolean predicate evaluates to TRUE, the launching step launches execution of said one activity in said activity's execution environment with an execution priority specified according to the priority level.

By taking over workload management functions the WFMS becomes independent of the availability of a workload load management systems (WLMS). Thus the current teaching can be applied to almost all state of the art systems being of a significant advantage in a distributed and heterogeneous processing environment being the typical application environments for WFMS. A most important advantage of the current invention is that the priority execution specifications can be applied to each individual process instance. As the Boolean predicates are evaluated based on the specific context of a certain process instance the different contexts may result in different priorities for different process instances. Thus the current approach is even capable to respond dynamically with different priority levels to changes occurring during execution of a process instance.

BRIEF DESCRIPTION OF THE DRAWINGS

FIG. 1 shows the example of the definition of a process model including priority specifications on the level of a performance sphere as well as on the activity level.

FIG. 2 reflects a first example of a priority execution specification.

FIG. 3 reflects a second example of a priority execution specification.

DESCRIPTION OF THE PREFERRED EMBODIMENT

The current invention is illustrated based on IBM's MQSeries Workflow workflow management system. Of course any other WFMS could be used instead. Furthermore the current teaching applies also to any other type of system which offers WFMS functionalities not as a separate WFMS but within some other type of system.

Moreover if the current teaching is referring to a "message" this has to be understood as a general exchange of information via some sort of communication system not limited to messaging system in specific.

Introduction

The following is a short outline on the basic concepts of a workflow management system based on IBM's MQSeries Workflow WFMS as far as it is of importance for the current invention: From an enterprise point of view the management of business processes is becoming increasingly important: business processes or process for short control which piece of work will be performed by whom and which resources are exploited for this work, i.e. a business process describes how an enterprise will achieve its business goals. A WFMS may support both, the modeling of business processes and their execution.

Modeling of a business process as a syntactical unit in a way that is directly supported by a software system is extremely desirable. Moreover, the software system can also work as an interpreter basically getting as input such a model: The model, called a process model or workflow model, can then be instantiated and the individual sequence of work steps depending on the context of the instantiation of the model can be determined. Such a model of a business process can be perceived as a template for a class of similar processes performed within an enterprise; it is a schema describing all possible execution variants of a particular kind of business process. An instance of such a model and its interpretation represents an individual process, i.e. a concrete, context dependent execution of a variant prescribed by the model. A WFMSs facilitates the management of business processes. It provides a means to describe models of business processes (build time) and it drives business processes based on an associated model (run time). The meta model of IBM's WFMS MQSeries Workflow, i.e. the syntactical elements provided for describing business process models, and the meaning and interpretation of these syntactical elements, is described next.

A process model is a complete representation of a process, comprising a process diagram and the settings that define the logic behind the components of the diagram. Important components of a MQSeries Workflow process model are:

Processes
Activities
Blocks
Control Flows
Connectors
Data Containers
Data Structures
Programs
Staff Not all of these elements will be described below.

Activities are the fundamental elements of the meta model. An activity represents a business action that is from a certain perspective a semantic entity of its own.

A MQSeries Workflow process model consists of the following types of activities:

Program Activity: Has a program assigned to perform it. The program is invoked when the activity is started. In a fully automated workflow, the program performs the activity without human intervention. Otherwise, the user must start the activity by selecting it from a runtime work list.

Process activity: Has a (sub-)process assigned to perform it. The process is invoked when the activity is started. A process activity represents a way to reuse a set of activities that are common to different processes.

The flow of control, i.e. the control flow through a running process determines the sequence in which activities are executed. The MQSeries Workflow workflow manager navigates a path through the process.

The results that are in general produced by the work represented by an activity is put into an output container, which is associated with each activity. Since an activity will in general require to access output containers of other activities, each activity is associated in addition with an input container too.

Connectors link activities in a process model. Using connectors, one defines the sequence of activities and the transmission of data between activities. Since activities might not be executed arbitrarily they are bound together via control connectors. A control connector might be perceived as a directed edge between two activities; the activity at the connector's end point cannot start before the activity at the start point of the connector has finished (successfully). Control connectors model thus the potential flow of control within a business process model. Data connectors specify the flow of data in a workflow model. A data connector originates from an activity or a block, and has an activity or a block as its target. One can specify that output data is to go to one target or to multiple targets. A target can have more than one incoming data connector.

Process definition includes modeling of activities, control connectors between the activities, input/output container, and data connectors. A process is represented as a directed acyclic graph with the activities as nodes and the control/data connectors as the edges of the graph. The graph is manipulated via a built-in graphic editor. The data containers are specified as named data structures. These data structures themselves are specified via the DataStructureDefinition facility. Program activities are implemented through programs. The programs are registered via the Program Definition facility. Blocks contain the same constructs as processes, such as activities, control connectors etc. Process activities are implemented as processes. These subprocesses are defined separately as regular, named processes with all its usual properties. Process activities offer great flexibility for process definition. It not only allows to construct a process through permanent refinement of activities into program and process activities (top-down), but also to build a process out of a set of existing processes (bottom-up).

All programs which implement program activities are defined via the Program Registration Facility. Registered for each program is the name of the program, its location, and the invocation string. The invocation string consists of the program name and the command string passed to the program.

The Prioritization Approach Within WFMS

Business processes are made up of a set of activities. Business processes quite often consist of parts, for instance individual activities or collections thereof, that are time critical while others are not.

For instance a group of activities can be perceived as a set of services that are related from a business point of view, i.e. a unit of work that must jointly fulfill a performance goal. For example, a collection of application steps to be performed by a clerk while a customer is waiting for a response.

Also parts of a process that are carried out automatically, that means without any user intervention, are such candidates.

Other candidates that are time critical are atomic spheres and processes that implement message broker functionality. Atomic spheres are a collection of transactional workitems, i.e. activities within the process model, with a common commit scope and thus representing a global transaction. For the purpose to define such atomic spheres the process model can be analyzed to identify subgraphs having the property that such a subgraph does not contain not necessarily different activities which are connected by a path of control connectors which contains at least one activity not contained in said atomic-sphere.

The derivation of such collections of time critical activities is difficult and cumbersome in non-trivial cases because of the lack of information about the relation of application functions: This information is mostly hidden in special application programs, or the relation changes because of new requirements, because applications are integrated in new ways for interoperability etc. The larger the number of different applications participating in the workload management the more complex the situation becomes. The situation is even worse in case of integration of different application, especially if the applications originally have not be designed to work together.

As it is typically the case in heterogeneous distributed processing environment, WFMS cannot rely on the support of an underlying WLMS for managing the processing targets of its managed activities. Current state of the art WFMS neither do have the information nor the capabilities which activities to favor with respect to others.

The current teaching proposes the approach of assigning priority levels to activities already within the process model. Moreover it is suggested to enrich the process model with semantic relations of application functions as being collections of activities that should be pushed through the system in "optimal time", leading to the concept of performance spheres. Thus according to the current teaching priorities can be assigned on multiple levels: on the level of the whole process model, on the level of a new concept of performance spheres or on the level of individual activities; the later level overriding the settings of the preceding levels. At execution time the WFMS is responsive to these specifications allowing it to set the priority with which a particular activity or set of activities should be carried out. The proposed solution uses the facilities of the operating system and middleware, such as message queuing to control the performance of parts of a workflow, rather than a workload management system. As such it can deployed in all environments rather than being limited to certain platforms.

To identify the priority that should be assigned to an activity or a set of activities, a set of new properties are added to the meta model of the WFMS; i.e. the priority definitions are already included in the process model of a business process.

First a new keyword EXECUTION_PRIORITY is added to the specification of an activity. Valid entries are CRITICAL, HIGH, MEDIUM, and LOW (or any other conceivable enumeration). For consistency, the keyword EXECUTION_PRIORITY may also be attributed to the whole process model. The specification on the process model level serves as a default from which all activities inherit; that means if nothing is specified on the activity level the setting at the process level is used.

Second, a new section PERFORMANCE_SPHERE is added that allows to identify a sub-graph in the process model. The EXECUTION_PRIORITY allows to assign an execution priority to the sub-graph. Within a performance sphere the execution priority defined for the sphere becomes the default execution priority for the individual activities. Again the priority specifications on the activity level may override the specifications on the performance sphere level.

The example shown in FIG. 1 shows the definition of a performance sphere. The sphere contains two activities. Referring to FIG. 1 it shows the definition of a performance sphere (100) defining the default execution priority (101) for activities within the performance sphere. Moreover the definition of two activities (110) and (120) are visualized as part of the above performance sphere (112, 113). Within the specifications of the activity (110) an explicit execution priority (111) is defined thus overriding the corresponding default execution priority (101) on the level of the encompassing performance sphere. In contrast to that the specification of the activity (120) comprises no extra priority definition, therefore it will be executed with the execution priority defined by its encompassing performance sphere (100).

According to the current invention the WFMS will be responsive to the priority specifications when executing the process model at run-time. The invention allows the WFMS balance its workload along the following dimensions:

1. by setting the execution priority of the activity implementation, and/or
2. by setting the execution priorities of the workflow system itself, and/or
3. by setting the priorities of the messages relating to the processing of said activity for communication within said WFMS and/or with said activity according to the activity's execution priority.

Setting the Priority of the Activity Implementation: State of the art operating systems assign a priority to each execution unit of the operating system, such as processes and threads, also called light-weight processes. The current specification uses the term process in a general meaning comprising both of these concepts. Based on the priority, more or less resources are made available to the operating system process. The priority is assigned to the operating system process entity when the process is created. The priority can be supplied by the creator of the operating system process; that means the starter of an executable can specify the priority of the operating system process that is created for the executable. The executable itself can change the priority of the operating system process it is running in at any time (this mechanism will be used to allow the already executing WFMS to reset its own execution priority—see below).

If the activity implementation is an executable, the WFMS can assign a particular operating system priority under which the executable can be carried out. This way the program executor can give the executable a particular operating system priority based on the execution priority assigned to the activity. Other mechanism for prioritization exist for other type of activity implementations, such as objects managed by an object server, or the sending out a message that is picked up by the activity implementation. Moreover setting of the execution priority can either be performed by the workflow management system or the activity implementation or a combination of both. If for example the activity implementation is invoked via a message sent via a message queuing system, then the workflow management system sets the priority of the message that is sent and the activity implementation sets its execution priority based on the execution priority submitted in the message.

Setting the Workflow Management System Execution Priority: Complementary to changing the operating system priority for the executables, a further dimension of the current invention is that the workflow system itself modifies its own operating system priority when carrying out an activity implementation or when processing a performance sphere.

Setting the Message Priority: If the WFMS uses a communication system, like for instance message queuing, for communication between the different components of the WFMS and the communication systems provides some type of priority assignable to the communication units (called "messages" in the current description) the current invention suggests also to dynamically alter the priorities of those messages in accordance to the priorities of the activities; i.e. it is suggested to set the priorities of the messages relating to the processing of a certain activity for communication within said WFMS and/or between different WFMS and/or with said activity according to the activity's execution priority.

Above mentioned possibilities to influence priority based execution, i.e. setting the execution priority of the workflow system itself and setting execution priority of the messages, are independent from one another and thus can be exploited separately or in combination.

Context Based Execution Prioritization

In its important embodiment the teaching of the current invention goes beyond the characteristics outlined above. This enhanced teaching originates from the observation of the following problem. Exploiting the above mentioned capability to control the execution priority within a WFMS has the disadvantage that all process instances (i.e. all activities and/or performance spheres comprised by the instances of a certain process model) of a particular business process are executed with the same priority. There is no differentiation between process instances whose processing is more important than another one. For example, for a money transfer process all instances are carried out with the same priority; that means there is no difference in execution priority and thus in speed between a $10,000,000 and a $5 transfer. This behavior is actually caused by the fact that the priority execution specifications relate to the process model only and are incapable of taking into account the peculiarities of the various process instances resulting from instantiations of a certain process model. Moreover due to this deficiency the execution priority assignments are static in nature and cannot change dynamically during the lifetime of a certain process instance.

To overcome these deficiencies the current invention includes a collection of several features:

I. The priority execution specifications as outlined above are extended by a further language construct. The priority execution specifications can now comprise an (arbitrary complex) Boolean expression which will be evaluated by the WFMS at run-time. Depending on the truth value of this Boolean predicate the WFMS assigns a certain priority level to an activity and launches execution of the activity accordingly. The particular priority levels can also be specified within the priority execution specifications.

II. A particular instance of a business process is characterized uniquely by a set of data, which is called the context. The context data may be entered when the process is started or returned by an activity. Depending on the metamodel of the WFMS the data is managed in input/output containers associated with the process and each activity as in MQSeries, in key data containers (comprising most important common data) or global containers or some other type of data storage shared between activities. To allow for different execution priorities for different process instances, the current invention suggests that the WFMS provides the capability to take into account the context, i.e. the contents of those container fields, when evaluating said Boolean predicates for assigning the execution priority of the process, individual activities, or performance spheres. Therefore said Boolean predicates can refer to variables, whose values are not part of the process model, but which will be determined at run-time from the context of a process instance.

III. At runtime, the WFMS honors those definitions by a delayed evaluation of these Boolean predicates. In other words said Boolean-predicate is evaluated just before launching execution of an activity to base said evaluation on the most current context of that particular process instance. By this means it is possible that during the lifetime of a process instance one activity may change the context and these changes will contribute at once to the evaluation of Boolean predicates.

In contrast to the current teaching the prioritization approach as outlined above under "The Prioritization Approach Within WFMS" is applied only once a certain process instance has been created and is worked on by the WFMS; thus this approach does not make any difference at all between the point in time before and after the process instance itself has been created; that means all requests for the execution of a process instance of a process model are treated the same until processing of the request has actually started and creation of the process has been initiated. The current invention instead offers further improvements by distinguishing two different phases where the priority execution specifications do apply:

Phase 1—preparation phase

Phase 2—execution phase; i.e. the time when the process has been created and is being worked on.

Phase 1 relates to the time between the issue of the START process request by a WFMS client and the obtaining of the request by the WFMS server. If communication takes place for instance via a message queuing system, then this refers to the time period between the client putting the message into a queue and the WFMS obtaining the message from the queue. Processing of requests is carried out by the WFMS server by performing the following sequence:

1 DO UNTIL shutdown requested
2 Retrieve next request with highest priority
3 Carry out request
4 END If communication is via message queuing, then the message queuing system allows to return the messages in priority order. Therefore the current invention suggests to honor the execution priority specifications in phase 1 by sending the START message via the communication system to the WFMS server and setting said message to a message priority corresponding to specified priority level. This is possible as the WFMS client knows the properties of the process model from which an instance is to be created and also knows the contents of the context i.e. the container fields. This approach is the most efficient one.

Another approach is required when the client does not know the definitions of the particular process model. This is, for example, the situation when the process is started by a message, possibly in XML format, sent to the WFMS's input queue. In this case, the WFMS server must implement an additional algorithm which allows to respond to those messages with highest priority first. The following example outlines one possible algorithm; the important part is represented by statements 2 to 4:

1 Determine priority sequence by combining all priorities of all process models
2 DO UNTIL all requests are processed
3 Browse for request with highest priority
4 END
5 Get request The efficiency of this algorithm depends on the efficiency that the message queuing system provides for parsing requests. If the message queuing system provides powerful queries, other algorithms could be derived based on query technology.

The important point here is that based on above teaching the priority execution specifications can even be exploited within Phase 1 to improve the performance for instantiation of a certain process model.

An Example of Context Based Execution Prioritization

The following examples illustrate the support of context-based execution priorities in more details.

FIG. 2 visualizes an example of a priority execution specification related with a process model as a whole. As a consequence the priority execution specification will be assigned to all activities comprised by said process model. The priority execution specification EXECUTION_PRIORITY is associated by 2 Boolean predicates (210, 220) and their corresponding priority levels (211, 221) which are assigned to activities of the process instance in case the Boolean predicate evaluates to TRUE.

According to this definition of a loan process (201) activities of a process instance are executed with HIGH priority when the value of the loan amount LoanAmount is higher than $10.000, with MEDIUM priority when the value is between $5.000 and $10.000, and with LOW priority when the value is below $5.000.

The input container (being part of the context) of the process instance, identified by the Input keyword, is the data structure LoanProcessingData which contains a field LoanAmount. This variable is used to determine the actual execution priority at run-time based on its most current value extracted from the context by the WFMS.

Sometimes the context information, such as the amount of the loan LoanAmount, is not known until some time into the process. In this case the invention suggests, that the EXECUTION_PRIORITY specification on the process level supports to reference the contents of an output container of another activity as illustrated in FIG. 3.

The first activity CollectData (301) collects the loan amount LoanAmount (302), which is then used to determine the execution priority as specified in the EXECUTION_PRIORITY statement using multiple Boolean predicates. The EXECUTION_PRIORITY specification of the process therefore references the appropriate field (304) in the output container (305), identified by the Output keyword (306), of CollectData activity via the CollectData.Output.LoanAmount specification.

Thus applying the teaching of the current invention the process instance starts with execution priority LOW which dynamically may change as soon as the contents of the LoanAmount field is known. If the LoanAmount is between $5,000 and $10,000, the execution priority is bumped to MEDIUM; if the LoanAmount is higher than $10,000, the execution priority is bumped to HIGH.

Similar context based EXECUTION_PRIORITY specifications can be associated to performance spheres or individual activities.

ADVANTAGES OF THE INVENTION

By taking over workload management functions the WFMS become independent of the availability of a workload load management systems (WLMS). Thus the current teaching can be applied to almost all state of the art systems being of a significant advantage in a distributed and heterogeneous processing environment being the typical application environments for WFMS. A most important advantage of the current invention is that the priority execution specifications can be applied to each individual process instance. As the Boolean predicates are evaluated based on the specific context of a certain process instance the different contexts may result in different priorities for different process instances. Thus the current approach is even capable to respond dynamically with different priority levels to changes occurring during execution of a process instance.

Due to the delayed evaluation of the Boolean predicates the most current context is exploited and a very dynamic behavior is achieved.

The current teaching can even be applied if an instance of a process model has not been created yet; thus the start-up processing of a certain process instance can already benefit from the prioritization technology.

Moreover, the workload processing is not limited to the activity only. The proposed teaching allows in addition the WFMS itself and the communication aspects to participate within the workload processing. The invention teaches that those portions of the WFMS and the communication system which directly support the processing of a certain process instance are also prioritized in accordance to the activity's priority leading in a further increase of the efficiency of the workload processing.

By allowing to assign execution priority specifications on various levels: on the level of the process model as a whole, and/or on the level of the performance sphere concept an/or finally for individual activities a business process represented by a process model can be managed on all levels of granularity.

What is claimed is:

1. A computerized method of managing workload within a Workflow-Management-System (WFMS) said method being executable by said WFMS on at least one computer system, said WFMS comprising a process-model, said process-model comprising one or more activities being nodes of an arbitrary graph, and directed edges of said graph defining a potential control-flow within said process-model, said method comprising the steps of:

analyzing said process-model to determine if a priority-execution-specification is assigned to said one activity comprising at least one Boolean-predicate and a priority-level, and in an affirmative case, evaluating said Boolean-predicate using a variable-value not comprised in said process-model but said variable-value being comprised in a context of an instance of said process-model, and, if said Boolean-predicate evaluates to be TRUE, launching execution of said one activity in said activity's execution-environment, said WFMS setting its own execution-priority for the WFMS-internal processing relating to said one activity with respect to the WFMS's execution-environment to the execution-priority specified according to said priority-level.

2. A method of managing workload within WFMS according to claim 1, wherein said Boolean-predicate is evaluated just before launching execution of said one activity to base said evaluation on a most current context.

3. A method of managing workload within the WFMS according to claim 1, wherein said context comprises a data storage shared between activities, wherein said context comprises an global container of said instance of said process-model, wherein said context comprises an input-container of said one activity, and wherein said context comprises an output-container of a certain activity.

4. A method of managing workload within the WFMS according to claim 1 wherein said WFMS comprises at least one WFMS-client and at least one WFMS-server, wherein, if an instance of said process-model has not been instantiated yet, said WFMS-client evaluates said Boolean-predicate, and said WFMS-client sends a START message via a communication-system to said WFMS-server setting said message to a message-priority corresponding to said priority level, and said communication-system being responsive to said message-priority by handling its delivery according to said priority-level, and said WFMS-server being responsive to said message-priority by instantiating said process-model and launching execution of said instance of said process-model according to said priority-level.

5. A method of managing workload within the WFMS according to claim 1, wherein, if said Boolean-predicate evaluates to TRUE, one or more messages for communication within said WFMS and/or between different WFMS and/or with said activity via a communication-system said message relating to the processing of said activity are set to the execution-priority specified according to said priority-level.

6. A method of managing workload within the WFMS according to claim 1, wherein, if said priority-execution-specification is specified with said process-model, said method further comprises the step of assigning said priority-execution-specification to all activities comprised by said process-model, wherein, if said priority-execution-specification is specified with a performance-sphere, said performance-sphere comprising a sub-graph of said process-model, said method further comprises the step of assigning said process-execution-specification to all activities within said performance-sphere, and wherein, if said priority-execution-specification is specified with said one activity, said method further comprises the step of assigning said process-execution-specification to said one activity.

* * * * *